United States Patent Office 2,809,983
Patented Oct. 15, 1957

2,809,983
HYDROXYANILINOPROPIONITRILES

Samuel Allen Heininger, Dayton, Ohio, assignor to Monsanto Chemical Company, St. Louis, Mo., a corporation of Delaware No Drawing. Application March 12, 1956,
Serial No. 570,721

4 Claims. (Cl. 260—465)

The present invention relates to nitriles, and more particularly to the three hitherto unknown isomeric 3-(hydroxyanilino)propionitriles and to a method of preparing the same.

According to the invention, the 3-(hydroxyanilino)-propionitriles are prepared by contacting the respective isomeric ortho-, meta-, and para-aminophenols with acrylonitrile at ordinary or increased temperatures in the presence of an acidic agent as catalyst. Advantageously, reaction of the aminophenol with the acrylonitrile may be effected by simply mixing the two reactants and catalyst in the presence or absence of an inert diluent or solvent and heating the resulting mixture at a temperature of, say, from 40° C. to the refluxing temperature of the mixture. Useful temperatures will depend on the pressure at which the addition reaction is conducted; thus, when operating at ordinary atmospheric pressures, temperatures of from about 100 to 200° C., depending upon the presence or absence of a diluent, give good results; whereas when operating under superatmospheric pressure, a lower temperature range, such as from 50° to 150° C., is recommended. Since preparation of the 3-(hydroxyanilino)propionitriles involves addition of one mole of the aminophenol to one mole of the acrylonitrile, the reactants may advantageously be used in equimolecular proportions; however, an excess of acrylonitrile may be used, if desired, to serve as a reaction diluent and to produce more complete reaction of the aminophenol.

The presence of inert solvents or diluents facilitates control of the present reaction. Examples of suitable solvents for the reaction are ether, nitrobenzene, dioxane, etc. An acidic catalyst should be employed as a constituent of the reaction mixture, in accordance with the process of the invention. As examples of useful catalysts may be mentioned acidic metal salts such as cuprous or cupric, stannous or stannic, ferrous or ferric acetate, sulfate or chloride; organic or inorganic acids such as acetic, sulfuric, phosphoric, or oxalic acid, etc. Since acrylonitrile is a readily polymerizable material, it is generally advantageous to conduct the addition reaction in the presence of a polymerization inhibitor such as hydroquinone, t-butylcatechol, etc.

The 3-(hydroxyanilino)propionitriles are useful for a variety of agricultural and industrial purposes. Thus, for example, they may be used in the chemical industry as chemical intermediates, e. g., for the synthesis of pharmaceuticals, or they may be used per se, or derivatives thereof may be used as rubber additives, e. g., for the inhibition of the degradation of compounded rubber stocks. They are also valuable as biological toxicants and may be used, for example, as nematocides, fungicides, herbicides, bactericides, miticides, etc. The organism producing tomato wilt, *Fusarium lycopersici*, is controlled by application of a 100 p. p. m. concentration emulsion of one of the 3-(hydroxyanilino)propionitriles of the present invention to the roots of tomato plants, by watering the soil in which the plants are growing with an emulsion of the nitrile compound.

The present invention is further illustrated but not limited by the following examples:

Example 1

A mixture of 109.1 g. (1.0 moles) of o-aminophenol, 79.5 g. (1.5 moles) of acrylonitrile and 100 ml. of dioxane in a 500 ml. flask was heated to reflux with stirring; to the flask was then added 13 ml. of glacial acetic acid. The reaction mixture was refluxed gently for 24 hours, and then 50 ml. of dioxane was distilled off and the black residue was dissolved in 800 ml. of a mixture of equal volumes of methanol and water, treated twice with activated charcoal, filtered, cooled and allowed to crystallize. The precipitate was a brown, crystalline solid, dry weight 89 g., M. 106–108° C. Concentration of the mother liquor and precipitation by addition of more water produced two additional portions of dark brown solid product, weighing 38 grams; total yield, 127 g.=78.4% theoretical yield. A portion of the first crystallizate was dissolved in a mixture of equal volumes of methanol and water and decolorized twice with charcoal. The solid which separated, in the form of fine, flat plates, was green-gray in color and gave a red solution in the methanol-water mixture; it was treated with sodium hydrosulfite to give a yellow-green solution which, on cooling, precipitated beautiful colorless, extremely thin plates of 3-(o-hydroxyanilino)propionitrile, M. 110–111° C. The identity of the product was confirmed by the infrared spectrum, which show the presence of CN and of NH and/or OH as well as absence of $NH_2$ groups, and also by the following analysis:

| | Found | Calculated for $C_9H_{10}N_2O$ |
|---|---|---|
| Percent C | 66.83 | 66.9 |
| Percent H | 6.25 | 6.32 |
| Percent N | 16.44 | 17.27 |

On repetition of this experiment, it was established that the product decomposes at below its distillation temperature.

Example 2

A mixture consisting of 327 g. (3.0 moles) of p-aminophenol, 212 g. (4.0 moles) of acrylonitrile, 300 g. of dioxane and 40 g. of glacial acetic acid was refluxed for 24 hours. The black viscous reaction product was then poured into two liters of a mixture of ice and water, whereupon there separated a black oil which solidified on standing to a solid of crystalline appearance. After the mixture had stood overnight, the precipitate was filtered off and dissolved in equal volumes of methanol and water, the solution was filtered, and the filtrate was cooled, to precipitate out fine small purple crystals melting at 84–86° C., and weighting 105 g. after drying. A portion of this solid was redissolved in an ethanol-water mixture and the solution decolorized with charcoal, to give on cooling a buff-colored precipitate; the filtrate gave a second crop which was originally buff but darkened to purple on standing and melted at 86–87° C. The elemental analyses of both crops of precipitate and the infra-red spectrum confirmed the identification of the product of this reaction as 3-(p-hydroxyanilino)propionitrile.

Example 3

A mixture of 109 g. (1.0 mole) of m-aminophenol, 100 g. of dioxane, 79.5 g. (1.5 moles) of acrylonitrile and 10 g. of acetic acid was refluxed for 24 hours. The reaction mixture was poured into a liter of ice water, whereupon a black fluid oil separated. The aqueous layer was decanted, and the oily black liquid was washed once more with water and then separated and extracted with approximately a liter of ether. The ether extract of the black oil was combined with an ether extract of the water layer, washed, dried over sodium sulfate, filtered, and evaporated. The residual liquid $n_D^{27}$ 1.573, weighed 112 g. Infra-red and elemental analysis confirmed the identification of the product as 3-(m-hydroxyanilino)propionitrile.

For application of the present compounds as fungicides the 3-(hydroxyanilino)propionitriles may be dispersed on a finely divided solid and employed as a dust, or may be dispersed in water with the aid of a wetting agent and the resulting aqueous dispersions employed as sprays. In another procedure, the products may be dissolved in an organic solvent and mixed with a wetting or emulsifying agent to prepare a concentrate suitable for the preparation of sprayable oil-in-water emulsions. Examples of presently useful wetting agents are soaps such as sodium laurate, nonionics such as the reaction products of oleyl alcohol and ethylene oxide, cationics such as trimethylcetyl ammonium iodide, etc. The fungicidal nitriles need be employed only in minor amounts to obtain the benefits of the compositions of the invention. The amount of fungicidally active compounds in the present compositions will vary with the fungicidal activity of the hydroxyanilinopropionitrile employed, the manner of application, the fungi which it is sought to destroy, etc., and may be adjusted accordingly.

While the invention has been described with particular reference to various preferred embodiments thereof, it will be appreciated that numerous modifications and variations are possible without departure from the invention.

What is claimed is:
1. 3-(hydroxyanilino)propionitriles.
2. 3-(o-hydroxyanilino)propionitrile.
3. 3-(m-hydroxyanilino)propionitrile.
4. 3-(p-hydroxyanilino)propionitrile.

References Cited in the file of this patent
UNITED STATES PATENTS 1,992,615   Hoffmann et al. ---------- Feb. 26, 1935

FOREIGN PATENTS 466,316   Great Britain ---------- May 26, 1937

OTHER REFERENCES

Galatis: Chemical Abst., vol. 15, p. 3464 (1921).
Shimo: Chemical Abst., volume 21, p. 1449 (1927).
Elderfield et al.: Journal of the American Chemical Society, vol. 68, pp. 1259 to 1263 (1946).